Nov. 16, 1937.     W. M. HILL     2,099,112
APPARATUS FOR TESTING INSULATION
Original Filed Oct. 29, 1931    3 Sheets-Sheet 1

INVENTOR
W. M. HILL
BY
Emery Robinson
ATTORNEY

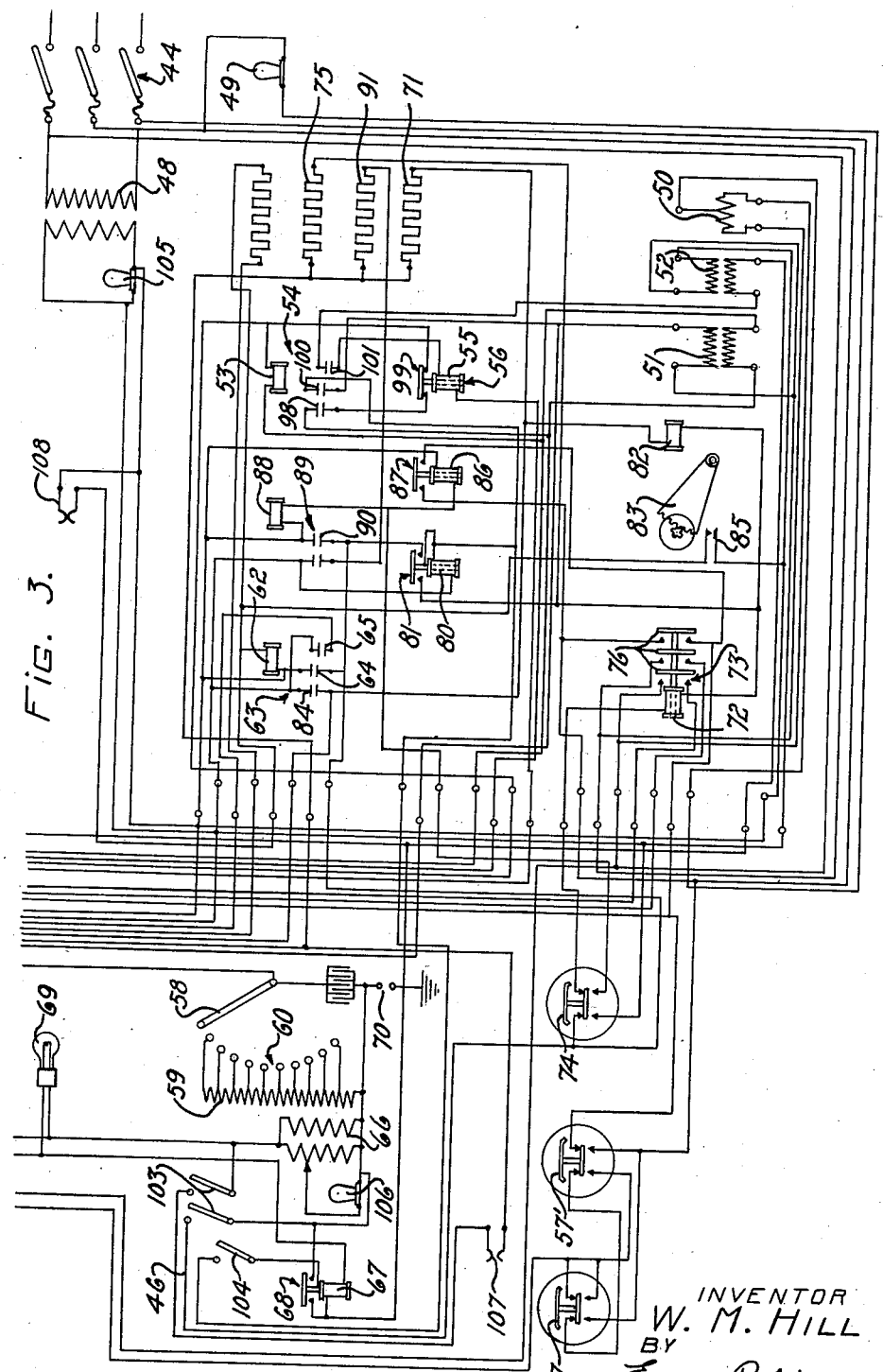

Patented Nov. 16, 1937

2,099,112

UNITED STATES PATENT OFFICE 2,099,112

APPARATUS FOR TESTING INSULATION

Walter M. Hill, Randallstown, Md., assignor to Western Electric Company, Incorporated, New York, N. Y., a corporation of New York Application October 29, 1931, Serial No. 571,811
Renewed January 26, 1937

8 Claims. (Cl. 175—183)

This invention relates to an apparatus for testing insulation and particularly to an apparatus for testing and inspecting rubber covered or insulated electrical wires or conductors.

The object of this invention is to provide an improved method and apparatus which will efficiently and rapidly test the insulation on electrical wires or conductors with a minimum of manual labor and attention.

In attaining this object a method and apparatus is provided wherein the insulated wire or conductor to be tested is passed from a supply reel through a testing unit or electrode, a counting mechanism, a distributor, and thereafter wound upon a take-up reel.

Figure 1:
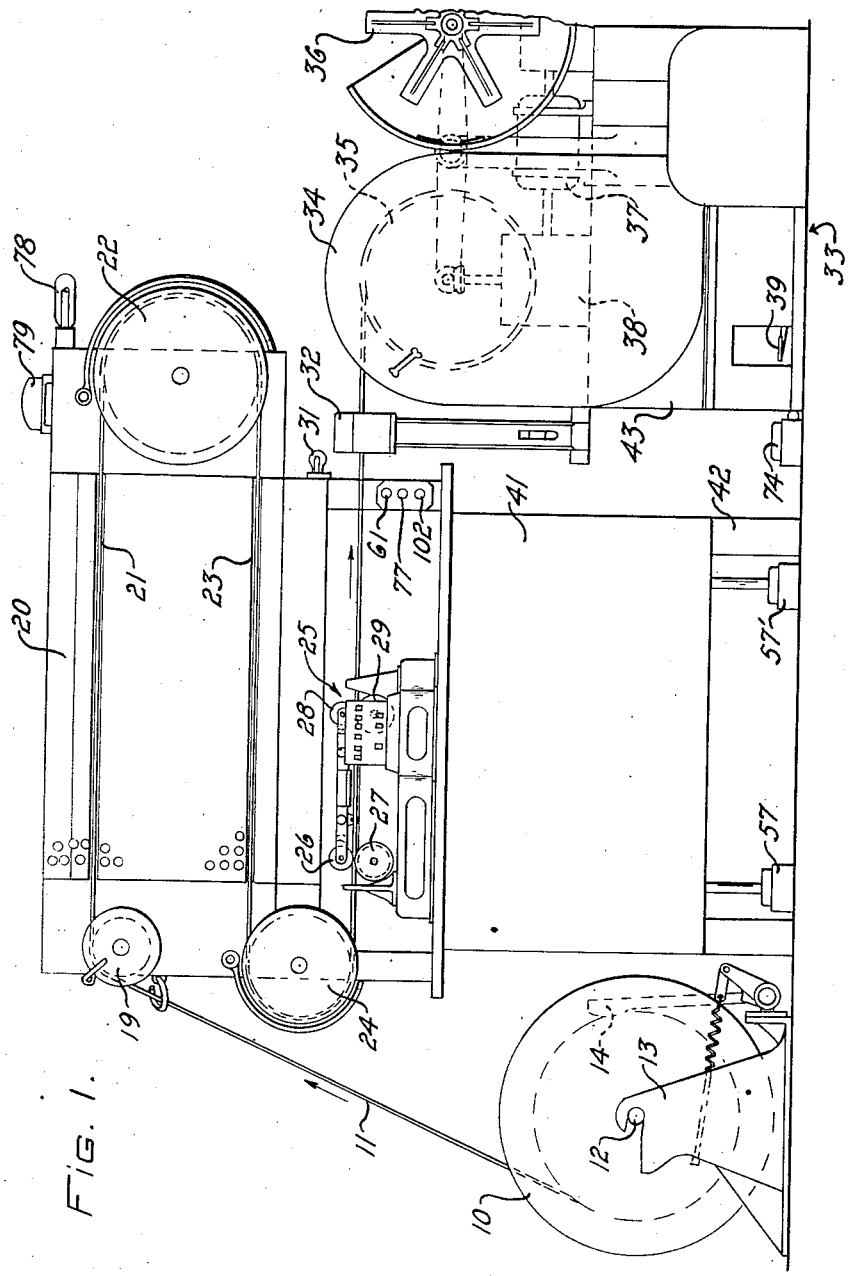
Figure 2:
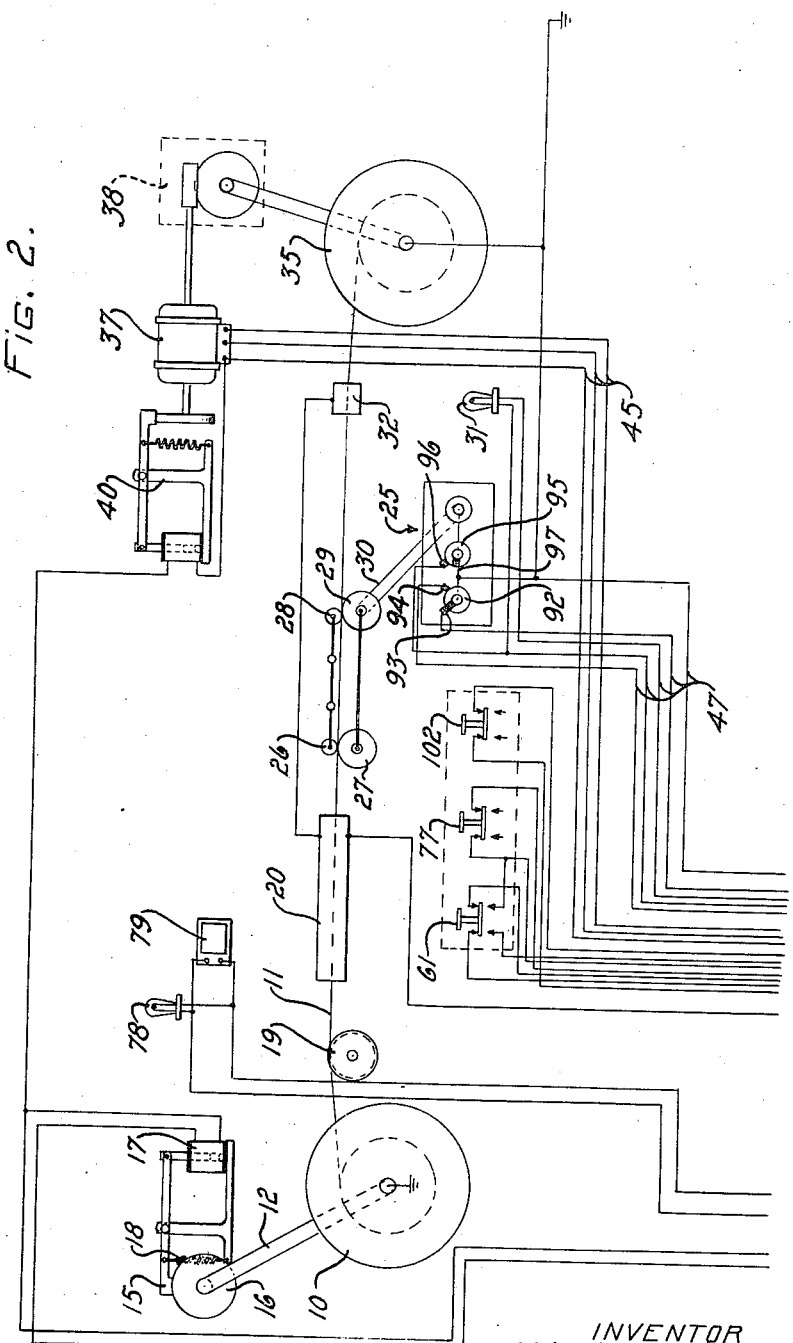

Other objects and advantages of the invention will be understood by reference to the following specification and accompanying drawings, in which Fig. 1 is a side elevation of a testing apparatus embodying the invention, and Figs. 2 and 3 combined constitute a wiring diagram of the electrical system embodied in the testing apparatus of the invention.

In the illustrated apparatus the insulated wire or conductor to be tested is arranged so that in passing through the testing unit or electrode it will complete an electrical testing circuit of predetermined voltage and energize suitable indicating means when there is a defect in the insulation, such as exposure of the wire or conductor, or insufficiency of the insulation for any reason to withstand the voltage of the testing circuit. The distributor mechanism is also included electrically in this same testing circuit and is adapted to indicate the exact position of the defect in the insulation so that the defective section of the wire or conductor can be repaired or removed therefrom. The counter mechanism is arranged to indicate the length of the wire or conductor which has been tested as well as closing an electrical circuit to an indicating means when a predetermined length of the wire or conductor has passed therethrough, and simultaneously to cause the breaking of an electrical circuit to stop the apparatus.

In the drawings, the usual form of supply reel 10 is shown having wound thereupon insulated wire or conductor 11 to be tested and is secured to shaft 12 mounted for rotation in the supporting stand 13, which is provided with a spring-pressed paddle brake 14 for preventing overrunning of the wire or conductor 11. In order to rapidly stop the rotation of the supply reel 10, as is required when a defect is encountered in the wire or conductor, a braking arrangement is provided consisting of a brake shoe 15 and co-operating brake drum 16 on the shaft 12, which is released by a solenoid 17, included in the motor circuit to be hereinafter described. When the solenoid is deenergized, due to the breaking of the motor circuit automatically or manually by the operator, the spring 18 will operate the brake to stop the rotation of reel 10 by forcing the brake shoe 15 into engagement with the brake drum 16 of the shaft 12.

The insulated wire or conductor 11 is threaded through the apparatus from reel 10 by passing it over sheave 19, through the testing unit or electrode 20, which is preferably formed with upper and lower testing channels. The wire or conductor 11, after passing through the upper channel 21, passes around sheave 22 through the lower testing channel 23 and around sheave 24. A form of testing unit or electrode is shown in detail in Patent No. 1,952,582, dated March 27, 1934, wherein the applicant is a joint inventor with Malcolm C. Cary.

From the testing unit or electrode the wire is passed through a counter or measuring device 25. This counter is provided with a series of contact wheels 26, 27, 28 and 29, between which the wire is passed. The wheel 29 is mounted upon a shaft, which operates the counter mechanism to indicate the number of feet of wire passing through the apparatus. The counter mechanism is shown schematically in Fig. 2 having contact members arranged in an electrical system to automatically stop the apparatus without disturbing the testing circuit when a predetermined length of wire has been passed therethrough, which is usually slightly less than the desired coil length, and, for purposes of illustration, the counter might be set to stop the apparatus at 990 feet. The counter mechanism is electrically connected to a signal lamp 31, which is illuminated when this predetermined length of wire has passed therethrough, and remains lighted until the operator manually causes more wire to pass therethrough until the desired coil length has been reached, in the illustrative example, 1,000 ft. of wire.

In order to distribute the wire upon the take-up reels evenly in layers, a reciprocable distributor 32 is provided through which the wire passes from the counter. This distributor is provided with a comparatively short testing unit or electrode included in the testing circuit, thus providing a means for definitely locating a defect in the wire being tested.

In order that the wire to be tested be drawn through the apparatus a motor driven take-up reeling mechanism 33 is provided with a pivoted cover or guard 34. Two individual reels 35 and 36 are mounted to rotate upon shafts provided on a saddle arrangement so that one reel is driven by motor 37 through a gear reducer 38 and suitable clutch mechanism, while the other reel is having the coil removed therefrom manually by the operator. A treadle mechanism 39 disconnects the driven reel from the motor and releases the clutch mechanism to permit manual revolving of the saddle to place the empty reel in place for coiling, as shown in the patent to Malcolm C. Cary No. 1,881,018, dated October 4, 1932.

A solenoid brake 40 similar to the brake described in connection with supply reel 10 is provided for the motor 37 and is connected into the motor circuit to be operated in the same manner as the brake for the reel 10.

The operating electrical equipment is located for convenience within an enclosure 41 beneath the table or support 42 for the testing unit and counting mechanism and within the base 43 of the support for the reeling mechanism 33.

To prepare the apparatus for testing, it is necessary to place the electrical system in operation before threading the wire or conductor through the machine, so that the solenoid brakes can be released and the first length of wire or conductor leading from the supply reel 10 to the take-up reel 35 will be subjected to test. To prepare the apparatus for the threading, the main switch 44 is closed, furnishing, for example, 440 volts 3 phase service from the supply lines to the motor circuit 45 and 110 volts single phase service to the primary of the testing circuit 46 and counter circuit 47 through the supply transformer 48. This supply transformer 48 will act as an insulation transformer, permitting parallel operation of a series of testing machines. A means such as the indicating lamp 49 indicates that the main switch 44 is closed and the apparatus is connected to the supply lines. The lamp 49 is connected into the circuit through its transformer 50. When the main switch 44 is closed, the counter transformer 51 and the counter interlock transformer 52 are excited to furnish, for example, 110 volts service for the coil 53 of the length relay 54 and the coil 55 of the length interlock relay 56. These transformers 51 and 52 act as insulation transformers to prevent the counter mechanism 25 from operating the fault relay.

Before the wire or conductor 11 can be unwound manually from supply reel 10 and threaded through the electrode and counter device, it is necessary to release the solenoid operated brake on the supply reel 10, and for this purpose two switches 57 and 57' are provided, shown in the form of foot operated switches, which when pressed complete a circuit through the supply reel brake solenoid 17 to release the brake shoe 15 so that the wire 11 can be drawn from the supply reel 10, threaded through the apparatus, as shown in Fig. 1, and the end thereof attached by a grounding clamp (not shown) to the take-up reel 35. The switches 57 and 57' perform the same function and are spaced for the convenience of the operator.

The voltage of the testing circuit can be regulated in accordance with the wire or conductor to be tested by the voltage tap switch 58 of the secondary circuit 59 of the testing transformer 60.

After the apparatus has been threaded as shown in Fig. 1, it is only necessary to operate the switch 61 shown as the push button type, which causes energization of the coil 62 of the sparker contactor 63, closing the sparker contacts 64, 84 and the interlock contacts 65, thus supplying 110 volts to the primary winding 66 of the testing transformer 60.

The coil 67 of the fault relay 68 is connected in series with the arc holding lamp 69, which lamp merely acts as a resistor, the resistance of which increases when carrying current, thereby limiting the current through the coil 67 of the fault relay 68 and the carbon arc gap 70 so that a voltage of 110 volts is placed across the carbon arc gap 70 as long as the gap is maintained. The pressing of the starting switch 61 places a sparker surge resistor 71 in series with the primary 66 of testing transformer 60 to limit the surge current and simultaneously build up the flux in the core of the testing transformer 60. Upon release of the push button switch 61 the sparker surge resistor 71 is shunted by the same, thus applying the entire 110 volts to the primary windings 66 of the testing transformer 60. The coil 72 of the motor contactor 73 is connected in multiple with the primary 66 of the testing transformer 60 through the normally closed contacts of the coiler brake release switch 74 shown in the form of a foot operated switch, and the motor contactor series resistor 75. Upon energizing the coil 72 of the motor contactor 73, the contacts 76 close, thus releasing the solenoid operated brakes of the supply reel 10 and the motor 37, starting the motor 37 to draw the wire or conductor 11 through the apparatus.

When the operator desires to stop the apparatus, the push button stop switch 77 is operated, which breaks the sparker interlock contacts to release the sparker contactor 63 and the motor contactor 73, which in turn de-energizes testing transformer 60 and stops motor 37.

If the apparatus is being operated and a defect or fault in the wire or conductor 11 occurs, it will be indicated by a sparking in the channel 21 or 23 of the testing unit or electrode 20 caused by the high voltage current jumping across the gap caused by the defect between the wire or conductor 11 and the testing unit or electrode 20. The defect or fault in the testing unit or electrode 20 causes a load to be applied to the secondary winding 59 of the testing transformer 60 breaking down the carbon arc gap 70. This arc, as mentioned previously, is maintained by the 110 volt circuit through the coil 67 of the fault relay 68 which, when a load is applied to the secondary winding 59 of the testing transformer 60, causes the coil 67 to operate the fault relay contacts and lock the same. The operation of the fault relay 68 causes the lighting of the indicating lamp 78, the audible signal or buzzer 79 to operate, and energizes the coil 80 of the stop relay 81, which shunts the coil 72 of the motor contactor 73 and locks itself through the contacts 64 of the sparker contactor 63. The shunting of the coil 72 of the motor contactor 73 de-energizes the same, thus stopping the motor 37. The stop relay 81, when it operates, connects the coil 82 of the sparker cut-off mechanism 83 to the line through the contacts 64, 84 of the sparker contactor 63, thus causing the sparker cut-off mechanism 83 to shunt the coil 62 of the sparker contactor 63, de-energizing the same, and consequently de-energizing the testing transformer 60.

The sparker cut-off mechanism 83 is a time-lag device provided with contacts 85 and requires 1 to 2 seconds to close. When the sparker contactor 63 is de-energized by reason of the shunting of its coil 62 by contacts 85, the sparker cut-off coil circuit is opened, thus permitting contacts 85 to reopen. The entire apparatus is then in condition to be started again.

To locate the exact position of the defect or fault in the wire that has caused the apparatus to stop as described above, it is necessary to pull the wire or conductor 11 through the apparatus manually with the motor stopped, but maintaining a testing voltage in the testing circuit so that when the defect or fault passes into the distributor 32, a sparking will occur and the fault or defect is readily disclosed for repair or removal of a section of the wire. The operator, to prepare the apparatus for this manual operation, operates switch 74, disclosed as foot operated, which breaks the circuit of the coil 72 of the motor contactor 73 and energizes the coil 86 of the coiler brake relay 87, which causes the solenoids of the supply reel 10 and motor 37 to be energized to release the brakes. Simultaneously with release of the brakes the coil 88 of the sparker auxiliary contactor 89, connected in multiple with the coil 86 of the brake relay 87, is energized to close the sparker auxiliary contactor 89 contacts 90. The surge resistor 91 of the sparker auxiliary contactor 89 is permanently connected in series with the primary windings 66 of the testing transformer 60, thus limiting the surge current when starting the flux in the transformer core and at the same time applying sufficient voltage to the wire or conductor 11 to permit location of the fault or defect. The operator, while holding switch 74 in operating position, turns coiling reel 35 by hand until the defect or fault indicates by sparking at the distributor 32.

The counter mechanism 25, as described above, will stop the apparatus after a predetermined length of wire or conductor 11 has been tested and coiled. In Fig. 2 of the drawings the counter wheel 92, indicating the length of wire in units of 100 ft., co-operates with two contact brushes 93 and 94, while the counter wheel 95, indicating the length of wire in units of 10 feet, co-operates with a single brush 96. The contact segments on these wheels 92 and 95, adapted to contact with the brushes, are connected electrically through their common shaft 97, which is grounded to the frame of the apparatus. The counter mechanism, when the segment of wheel 95 is rotated to contact with brush 96, as shown in Fig. 2, will stop the apparatus. These segments complete the counter circuit and the coil 53 of the length relay 54 is energized, and the indicating length signal lamp 31 is operated. The contacts 98 of the length relay 54 lock through the normally closed contacts 99 of the length interlock relay 56. The contacts 100 of the length relay connect the coil 80 of the stop relay 81 to the line to stop the apparatus. The contacts 101 of the length relay 54 connect the coil 55 of the length interlock relay 56, and when the counter is rotated by the drawing of the wire or conductor 11 through the apparatus by the operator to complete the coil, the contact segment of the counter wheel 92 will ground the brush 94, thus energizing the coil 55 of the interlock relay 56, opening the length relay interlock circuit, which releases the length relay 54. This then de-energizes the coil 55 of the length interlock relay 56 to restore both relays to their normal positions, preparing the apparatus for testing and forming another coil.

If a supply reel 10 is provided with slightly more wire or conductor 11 than is necessary for a coil of predetermined length as the exhaustion of the reel is about to be approached, it is desirable to increase the length of the coil without stopping the apparatus as would happen if the counter mechanism were permitted to function. To prevent the counter mechanism 25 from operating to stop the apparatus, the counter release button 102 is pressed, which opens the counter transformer 51 primary circuit, preventing its stopping the apparatus.

At times it may be desirable to coil the wire without supplying a test voltage to the testing unit 20 and distributor 32, and to accomplish this it is only necessary to open switch 103, which prevents excitation of the testing transformer 59.

When an extremely defective reel 10 of wire or conductor 11 is encountered, it can be run through the apparatus without automatically stopping the apparatus for repair or removal of the faults or defects by opening switch 104, which opens the circuit to the coil 80 of the stop relay 81. Switch 103 may then be periodically opened and closed manually as the wire runs through the apparatus until the insulation quality appears to be sufficiently better to warrant automatic operation.

Suitable safety devices and indicating means are provided in the apparatus such as the indicating lamp 105 connected into the circuit of transformer 48 and the indicating lamp 106 connected into the circuit of the testing transformer 59, as well as safety switches 107 and 108 on the door for the enclosure 41 for the electrical apparatus and the coiling cover or guard 34 respectively.

While the invention is illustrated and described more particularly with reference to a method of and apparatus for testing insulated electrical wire or conductors, the invention is not confined thereto but is intended to cover any other uses or modifications within the scope of the appended claims.

What is claimed is:

1. In a testing apparatus, electrically operated power means for passing an insulated conductor through the apparatus, a testing transformer for impressing a testing voltage upon said insulated conductor, a contactor connected to said transformer, a contactor for operating said power means, and means for automatically operating said contactors in sequence whereby the testing voltage is impressed upon the insulated conductor in advance of the energizing of the power means.

2. In a testing apparatus, electrically operated power means for passing an insulated conductor through the apparatus, electrical means for testing the insulation of said conductor as it passes through the apparatus, and electrically operated means for initiating the operation of said testing means and subsequently and automatically initiating the operation of said power means.

3. In an automatic testing apparatus for insulated conductors, the combination with electrically operated driving means for passing an insulated conductor through the apparatus, electrical means for testing the insulation of said conductor as it passes through the apparatus, a locating means connected to the testing means, braking means for said driving means, and electrical means controlled by said testing means to cause stopping of power supply to and braking of the driving means when a change in the insulation occurs in the testing means of electrical means for releasing the braking effect of said control means and automatically supplying a testing voltage to the testing means and the locating means, whereby the conductor can be manually passed under test through the locating means.

4. In an automatic combined testing and measuring apparatus for insulated conductors, the combination with electrically operated driving means for passing an insulated conductor through the apparatus, electrical means for testing the insulation of said conductor as it passes through the apparatus, and measuring means electrically connected to said power means, of control means automatically operated after a predetermined length of conductor has passed through the measuring means and also whenever a change in the insulation of the conductor appears in the testing means to cause stopping of power supply to and braking of the driving means and thereafter disconnecting the testing means, and means for operating the testing means and thereafter releasing the control means whereby the conductor can be passed through the apparatus manually and under test.

5. In a testing apparatus, electrically operated power means for passing an insulated conductor through the apparatus, electrical means for testing the insulation of said conductor as it passes through the apparatus, and a unitary electrically operated means for initiating the operations of said testing means and said power means in sequence.

6. In a testing apparatus, electrically operated power means for passing an insulated conductor through the apparatus, electrical means for testing the insulation of said conductor as it passes through the apparatus, and a unitary electrically operated means for initiating the operations of said testing means and said power means so that said power means will not operate until after initiating operation of said testing means.

7. In a testing apparatus, electrically operated power means for passing an insulated conductor through the apparatus, electrical means for testing the insulation of said conductor as it passes through the apparatus, and a single switching mechanism for sequentially initiating the operations of said testing means and said power means so that the initiation of the power means depends upon the initiation of the testing means.

8. In a testing apparatus, electrically operated driving means for passing an insulated conductor through the apparatus, braking means for said driving means, electrical means for testing the insulation of said conductor as it passes through the apparatus and electrically operated means for initiating the operation of said testing means and subsequently and automatically releasing the brakes and initiating the operation of the driving means.

WALTER M. HILL.